United States Patent
Muck et al.

(10) Patent No.: US 7,338,103 B2
(45) Date of Patent: Mar. 4, 2008

(54) COLLAPSIBLE COVER FOR VEHICLE INTERIOR

(75) Inventors: Todd Rupert Muck, Fowlerville, MI (US); Masroor Fahim, Canton, MI (US)

(73) Assignee: Toyota Motor Engineering & Manufacturing North America, Inc., Ann Arbor, MI (US)

(*) Notice: Subject to any disclaimer, the term of this patent is extended or adjusted under 35 U.S.C. 154(b) by 62 days.

(21) Appl. No.: 11/348,086

(22) Filed: Feb. 6, 2006

(65) Prior Publication Data

US 2007/0182179 A1    Aug. 9, 2007

(51) Int. Cl.
*B60J 9/00* (2006.01)
(52) U.S. Cl. .................................... 296/1.08
(58) Field of Classification Search .............. 296/1.08
See application file for complete search history.

(56) References Cited

U.S. PATENT DOCUMENTS

| | | | |
|---|---|---|---|
| 5,626,382 A * | 5/1997 | Johnson et al. | 296/146.7 |
| 5,639,140 A * | 6/1997 | Labrash | 296/39.1 |
| 5,641,195 A * | 6/1997 | Patel et al. | 296/187.05 |
| 5,695,865 A * | 12/1997 | Shimizu | 428/212 |
| 5,733,631 A * | 3/1998 | Kelman | 428/172 |
| 5,795,013 A * | 8/1998 | Keller et al. | 296/187.05 |
| 5,932,331 A * | 8/1999 | Jones et al. | 428/218 |
| 5,938,273 A * | 8/1999 | Williams et al. | 296/187.05 |
| 6,293,614 B1 * | 9/2001 | Takahara et al. | 296/187.05 |
| 6,302,477 B1 * | 10/2001 | Satou | 296/187.05 |
| 6,733,064 B2 * | 5/2004 | Fox et al. | 296/68.1 |

FOREIGN PATENT DOCUMENTS

| | | |
|---|---|---|
| JP | 5-23742 | 6/1993 |
| JP | 2000177459 | 6/2000 |

* cited by examiner

*Primary Examiner*—H Gutman
(74) *Attorney, Agent, or Firm*—Gifford, Krass, Sprinkle, Anderson & Citkowski, P.C.

(57) ABSTRACT

A trim member for covering an interior surface of a vehicle has an elastically collapsible outer wall. The trim member includes a substantially rigid frame and a cover. The frame is adapted for fixedly securing the cover to the interior surface. The cover is fixedly secured to and covering at least a portion of the frame, the cover being elastically deformable to prevent pinching of an appendage of a user between the frame and an adjacent fixed surface in the vehicle.

6 Claims, 1 Drawing Sheet

COLLAPSIBLE COVER FOR VEHICLE INTERIOR

BACKGROUND OF THE INVENTION

1. Field of the Invention

The invention relates to trim covers for covering vehicle interior surfaces. More particularly, the invention relates to a trim cover having an elastically deformable outer surface.

2. Description of the Related Art

Automotive vehicles typically include rigid plastic trim panels for covering exposed metal or other unsightly surfaces in the vehicle interior. For example, seat assemblies typically include plastic side panels for covering the sides of the seats. But, often the space between the side panels and a nearby surface, such as a door panel, center console or another side panel of an adjacent seat, is tight and may pinch or trap the hand or foot of an occupant in the vehicle. Thus, it remains desirable to provide a trim panel that maintains a desired outer appearance and at the same time collapses to prevent pinching or trapping of an occupant's hand or foot between the panel and an adjacent surface.

SUMMARY OF THE INVENTION

The invention improves over conventional trim cover designs by providing a trim member having an elastically collapsible outer wall. According to one aspect of the invention, a trim member is provided for covering an interior surface of an automotive vehicle. The trim member includes a substantially rigid frame and a cover. The frame is adapted for fixedly securing the cover to the interior surface. The cover is fixedly secured to and covering at least a portion of the frame, the cover being elastically deformable to prevent pinching of an appendage of a user between the frame and an adjacent fixed surface in the vehicle.

BRIEF DESCRIPTION OF THE DRAWINGS

Advantages of the present invention will be readily appreciated as the same becomes better understood by reference to the following detailed description when considered in connection with the accompanying drawings, wherein.

DETAILED DESCRIPTION OF THE INVENTION

Trim covers or members are commonly used for covering a surface in an automotive vehicle, such as a seat assembly, door panels, instrument panels, and the like. The invention provides an improved cover design with a compliant outer cover that collapses in an elastic manner to prevent pinching or constraining of an occupant's hands or other appendages between the cover and a substantially rigid surface in the vehicle.

Figure 1:
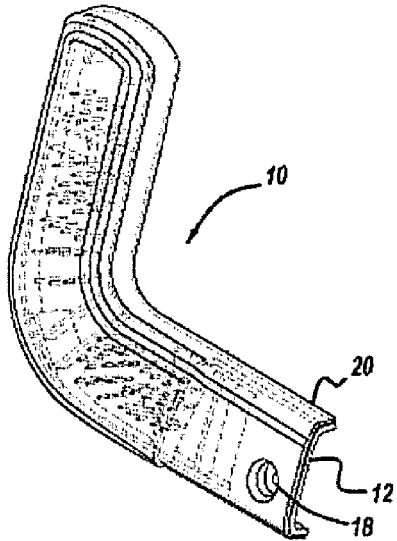
FIG. 1 is a perspective view of a trim member for a vehicle interior according to one embodiment of the invention.
Figure 2:
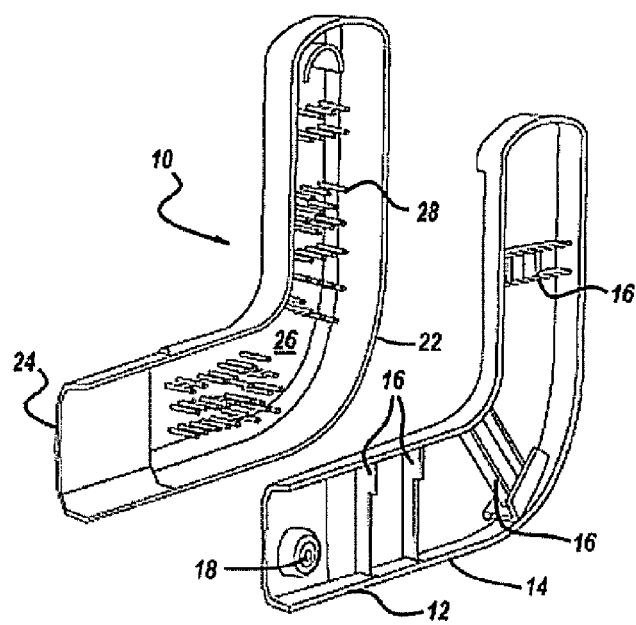
FIG. 2 is an exploded perspective view of the trim member of FIG. 1.

Referring to the FIGS. 1 and 2, the trim member 10 includes a substantially rigid frame 12 and a flexible cover 20. The frame 12, as shown in the figures, is designed for covering a side surface of a seat assembly (not shown). The trim member 10 will be discussed below in terms of assembly to a seat assembly, though It should be readily appreciated by those skilled in the art that the frame 12 can have any shape to cover a desired surface in the vehicle. As shown in the figures, the frame 12 includes a hole 18 that allows a fastener, such as a screw, to be inserted therethrough for securing the trim member 10 to the vehicle. Other fastening arrangements can be used for securing the trim member 10 to the vehicle, such as an integrally molded fastener formed on an inner or back surface of the frame 12 or a push pin extending through the hole 18 and a corresponding hole in the vehicle structure. In one embodiment of the invention, the frame 12 is made from molded polypropylene. The frame 12 can, however, be made from any substantially rigid plastic material known in the art, such as Acrylonitrate-Butadiene-Styrene (ABS) or nylon.

The frame 12 has an outer peripheral rim 14. A plurality of cross members 16 extend between opposite sides of the rim 14 to reinforce the frame 12. The cross members 16 can also be adapted to receive or support fasteners for securing the trim member 10 to the seat assembly. Optionally, a hook can be formed in the cross member 16 that works with the fastener extending through the hole 18 to secure the trim member 10 to the vehicle structure.

The cover 20 includes a peripheral edge 22 generally corresponding to the shape of the shape of the outer rim 14 of the frame 12. The cover 20 includes a wall having an outer surface 24 and an opposite inner surface 26. The outer surface 24 remains visible to the occupants of the vehicle when the trim member 10 is assembled to the seat assembly. A plurality of standoffs or bosses 28 extend outwardly from the inner surface of the cover 20. The bosses 28 are flexible to allow the cover 20 to be deformed inwardly toward the frame 12. The bosses 28 bias the cover 20 outwardly to its original shape after the cover 20 has been deformed. The cover 20 may be molded from any suitable rubber or other flexible moldable materials known by persons having ordinary skill in the art. Optionally, the outer surface 24 can be grained to match other plastic trim members in the vehicle. The cover 20 is fixedly secured to the frame 12 by any conventional methods, such as by the use of adhesives, by molding the cover 20 with the frame 12 as an insert, or vice versa, or by heat staking.

The invention has been described in an illustrative manner. It is, therefore, to be understood that the terminology used is intended to be in the nature of words of description rather than of limitation. Many modifications and variations of the invention are possible in light of the above teachings. Thus, within the scope of the appended claims, the invention may be practiced other than as specifically described.

The invention claimed is:

1. A trim member for covering an interior surface of an automotive vehicle, said trim member comprising:

a substantially rigid frame adapted for fixedly securing the trim member to the interior surface; and a cover fixedly secured to and covering at least a portion of the frame, the cover being elastically deformable relative to the frame, at least one flexible boss extending outwardly from an inner surface of the cover for biasing the cover outwardly relative to the frame.

2. The trim member as set forth in claim 1, wherein the frame is made from plastic.

3. The trim member as set forth in claim 1, wherein the cover is integrally formed with the frame during injection molding of the cover.

4. A trim member for covering an interior surface of an automotive vehicle, said trim member comprising:

a substantially rigid frame adapted for fixedly securing the trim member to the interior surface; and a cover fixedly secured to and covering at least a portion of the frame, the cover being elastically deformable relative to the frame, wherein the frame includes an outer peripheral rim and at least one cross member extending between opposite sides of the outer peripheral rim.

5. The trim member as set forth in claim 4, wherein the cross member is adapted to be fixedly secured to the vehicle.

6. A trim member for covering an interior surface of an automotive vehicle, said trim member comprising:

a substantially rigid frame adapted for fixedly securing the trim member to the interior surface; and a cover fixedly secured to and covering at least a portion of the frame, the cover being elastically deformable relative to the frame, wherein the frame includes a hole for inserting a fastener therethrough for securing the cover to the vehicle.

* * * * *